(12) United States Patent
Bozak et al.

(10) Patent No.: US 7,464,376 B2
(45) Date of Patent: Dec. 9, 2008

(54) SOLUTION RESOURCES DETERMINATION AND PROVISIONING

(75) Inventors: Erol Bozak, Pforzheim (DE); Alexander Gebhart, Bad Schoenborn (DE)

(73) Assignee: SAP AG, Walldorf (DE)

( * ) Notice: Subject to any disclaimer, the term of this patent is extended or adjusted under 35 U.S.C. 154(b) by 559 days.

(21) Appl. No.: 11/000,329

(22) Filed: Nov. 30, 2004

(65) Prior Publication Data

US 2006/0130055 A1    Jun. 15, 2006

(51) Int. Cl.
    *G06F 9/445* (2006.01)
(52) U.S. Cl. .................. 717/174; 717/175; 717/176; 717/177; 717/178
(58) Field of Classification Search .......... 717/174–178
    See application file for complete search history.

(56) References Cited

U.S. PATENT DOCUMENTS 7,069,514 B2 *   6/2006  DeMesa et al. ............. 715/744
2001/0042112 A1* 11/2001  Slivka et al. ................ 717/11
2003/0080988 A1*  5/2003  Moran et al. ............... 345/705
2005/0278354 A1* 12/2005  Gupta et al. ............... 707/100

* cited by examiner

*Primary Examiner*—Wei Y. Zhen
*Assistant Examiner*—Junchun Wu
(74) *Attorney, Agent, or Firm*—Finnegan, Henderson, Farabow, Garrett & Dunner, L.L.P.

(57) ABSTRACT

Methods and apparatus, including computer program products, for ad-hoc solution resources determination and provisioning. A method includes, in a target compute system residing in a network of interconnected compute systems, assigning a unique identifier to a requested solution, selecting providers for providing identified components of the requested solution, storing identifications of the selected providers along with associated identified components in a hierarchical data structure in a memory of the target compute system, each of the associated identified components defining a set of required resources, and installing the identified components listed in the hierarchical data structure.

8 Claims, 7 Drawing Sheets

US 7,464,376 B2

SOLUTION RESOURCES DETERMINATION AND PROVISIONING

TECHNICAL FIELD

The present invention relates to data processing by digital computer, and more particularly to solution resources determination and provisioning.

BACKGROUND

Any computerized business solution can have a multitude of available options to achieve a solution for a desired goal. Each option can provide the same solution using different software components, such as installers, source archives, metadata, helper components, and so forth. The hierarchy of software components that are used to provide a desired solution are often not initially known and can vary depending on the available resources that meet the various requirements that can be defined in a resource specification document. These software components can be located within a single computing system or within one or more computing systems that are part of a network of interconnected computer systems, such as those found in a client server network.

SUMMARY

The present invention provides methods and apparatus, including computer program products, for solution resources determination and provisioning.

In one aspect, the invention features a method including, in a target compute system residing in a network of interconnected compute systems, assigning a unique identifier to a requested solution, selecting providers for providing identified components of the requested solution, storing identifications of the selected providers along with associated identified components in a hierarchical data structure in a memory of the target compute system, each of the associated identified components defining a set of required resources, and installing the identified components listed in the hierarchical data structure.

In embodiments, selecting can include determining availabilities and capabilities of the providers, and storing selected providers in a provider registry. The hierarchical data structure can be a tree including a root system representing the solution identifier and leaf systems representing identified components.

Storing can include determining required sub-components for each of the identified components, identifying providers for providing the sub-components, and storing identifications of the identified providers.

In another aspect, the invention features a method including, in a network of interconnected compute systems, selecting one of the provider compute systems as a target system to execute a requested solution, identifying required components of the requested solution, identifying providers that can satisfy the required components, storing identifications of the identified providers along with associated identified required components in a hierarchical data structure in a memory of the target system, each of the associated identified components defining a set of required resources, and installing the required components listed in the hierarchical data structure.

In embodiments, identifying providers can include determining availabilities and capabilities of the providers, and storing selected providers in a provider registry. The hierarchical data structure can be a tree including a root system representing the solution identifier and leaf systems representing identified required components and associated providers.

Storing further can include determining required sub-components for each of the identified components, identifying providers of the sub-components, and storing identifications of the identified providers The invention can be implemented to realize one or more of the following advantages.

A complete parts list of an installable solution is determined ad-hoc on installation by a multi-step (i.e., cascaded) process, during which a complete solution is incrementally built and installed. A resource is something that is needed to completely install that solution (e.g., source archives, metadata, installers, helper software, and so forth).

When installing software on a particular computer, all resources (e.g., files, archives, metadata, helper software) are dynamically provisioned for that particular computer, depending on the requirements of the computer and on user preferences. In case of complex solutions that include multiple third party software, the parts breakdown of the complete solution can vary depending on which vendor is chosen for a particular component. The installer on the specific computer first determines what is going to be installed on the specific computer by dynamically generating a solution description tree (i.e., parts breakdown list), according to hardware requirements and user preferences.

A process dynamically builds a solution on customer's preferences during the installation and includes an incremental solution determination phase and a resource provisioning phase.

One implementation of the invention provides all of the above advantages.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
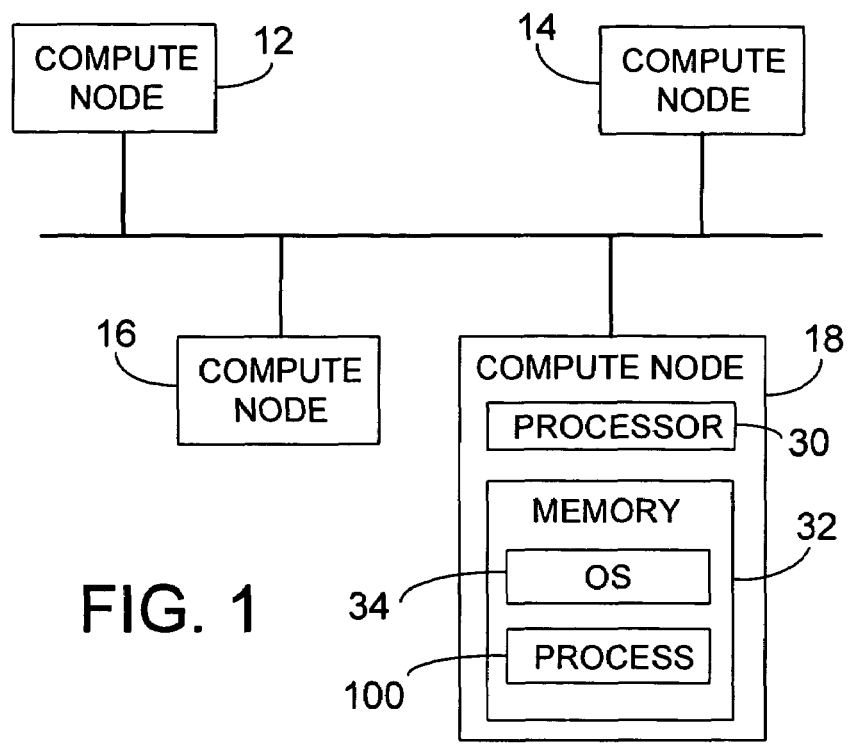
FIG. 1 is block diagram.

As shown in FIG. 1, an exemplary network 10 in accordance with one embodiment of the invention includes a number of interconnected compute systems 12, 14, 16, 18. Each of the compute systems, compute system 18 for example, can include a processor 30 and a memory 32. Memory 32 includes an operating system (OS) 34, such as Unix, Linux or Windows, and a solution resources determination and provisioning process 100, described below.

Each of the compute systems 12, 14, 16, 18 include resources (e.g., processor(s), memory, storage, installers, source archives, metadata, helper components, and so forth) that can be used to execute one or more components or parts of an installable solution. In general, a "parts breakdown" list, i.e., a hierarchy of software components, for any requested solution, is not known a priori for a target compute system, only a top level solution identification that identifies a name of a particular solution, which can include one or more components or parts. Any one particular component of the identified installable solution can be satisfied by one or more particular providers. Depending on the provider, the set of resources for that particular component and further parts breakdown for that specific component can vary.

Figure 2:
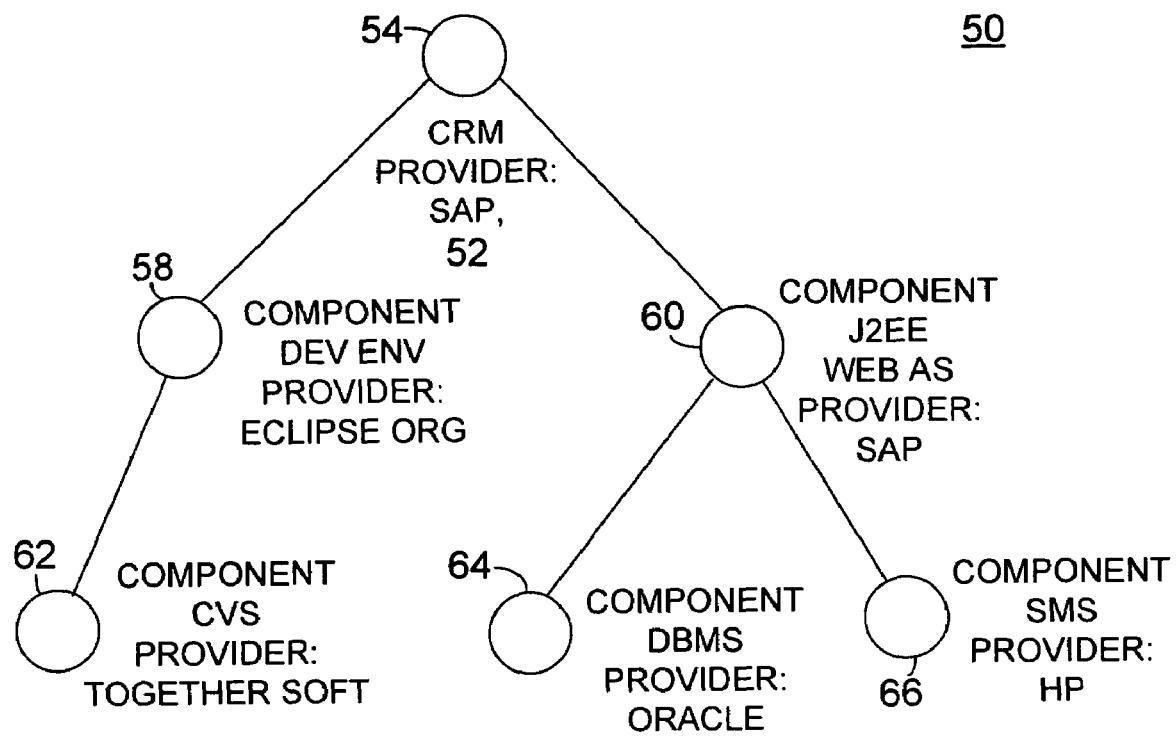
FIG. 2 is a block diagram.
Figure 2:
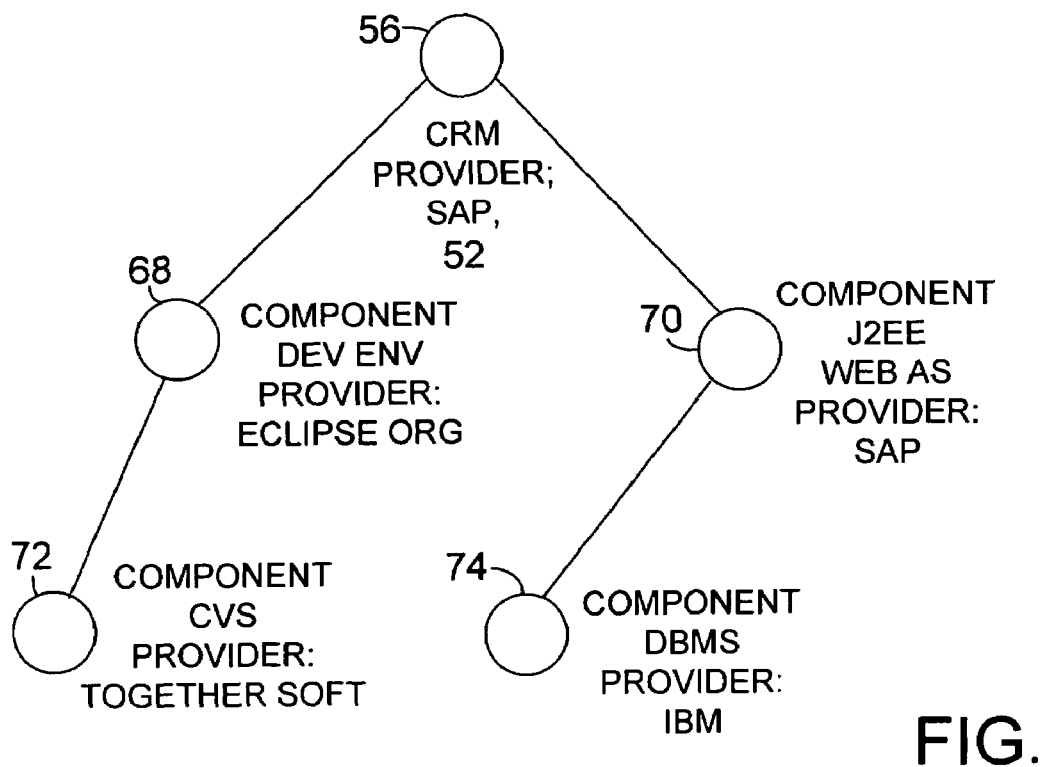

For example, referring to FIG. 2, an exemplary Customer Relationship Management (CRM) solution 50 from a single provider SAP 52 can have a first parts breakdown 54 or a second parts breakdown 56, both satisfying the same CRM solution 50 from provider SAP 52. CRM is an information industry term for methodologies, software, and usually Internet capabilities that help an enterprise manage customer relationships in an organized way. For example, an enterprise might build a database about its customers that described relationships in sufficient detail so that management, salespeople, people providing service, and perhaps the customer directly can access information, match customer needs with product plans and offerings, remind customers of service requirements, know what other products a customer had purchased, and so forth.

In the first parts breakdown 54 satisfying solution 50, provider SAP 52 requires a development environment component 58 from provider Eclipse Org and a Web Application Server (WebAS) Java 2 Platform, Enterprise Edition (J2EE) server component 60 from provider SAP. Components 58, 60 require additional components. More specifically, component 58 requires a Concurrent Versions System (CVS) component 62 from provider TogetherSoft. Component 60 requires a database management system component 64 from provider Oracle and software management software component 66 from provider Hewlett Packard (HP). In other examples, the first parts breakdown 54 can include other components and/or subcomponents from other providers.

In the a second parts breakdown 56, provider SAP requires a development environment component 68 from provider Eclipse Org and a Web Application Server (WebAS) Java 2 Platform, Enterprise Edition (J2EE) server component 70 from provider IBM. Component 68 requires a Concurrent Versions System (CVS) component 72 from provider TogetherSoft. Component 70 requires a database management system component 74 from provider IBM. In other examples, the second parts breakdown 56 can include other components and/or subcomponents from other providers.

A customer can have one or more preferences during an installation of components needed to satisfy a solution, such as the CRM solution 50. For example, the customer may prefer first parts breakdown 54 over second parts breakdown 56 to provide solution 50.

Process 100 dynamically builds a solution on the customer's preferences during the installation. Using process 100, a target provider queries providers within system 18 and providers within systems 12, 14, 16 10. In one particular example, possible providers are listed in a provider registry.

Figure 3:
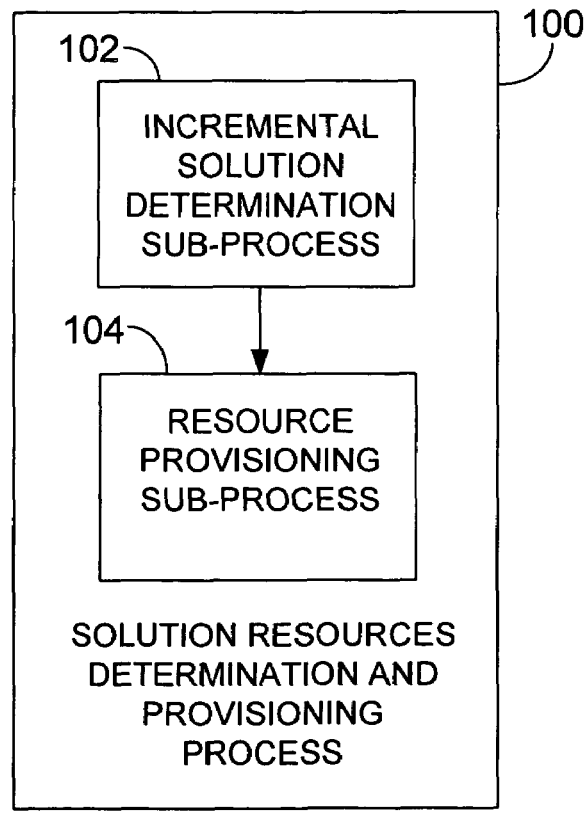
FIG. 3 is a flow diagram.

As shown in FIG. 3, process 100 includes an incremental solution determination sub-process 102 and a resource provisioning sub-process 104.

Figure 4:
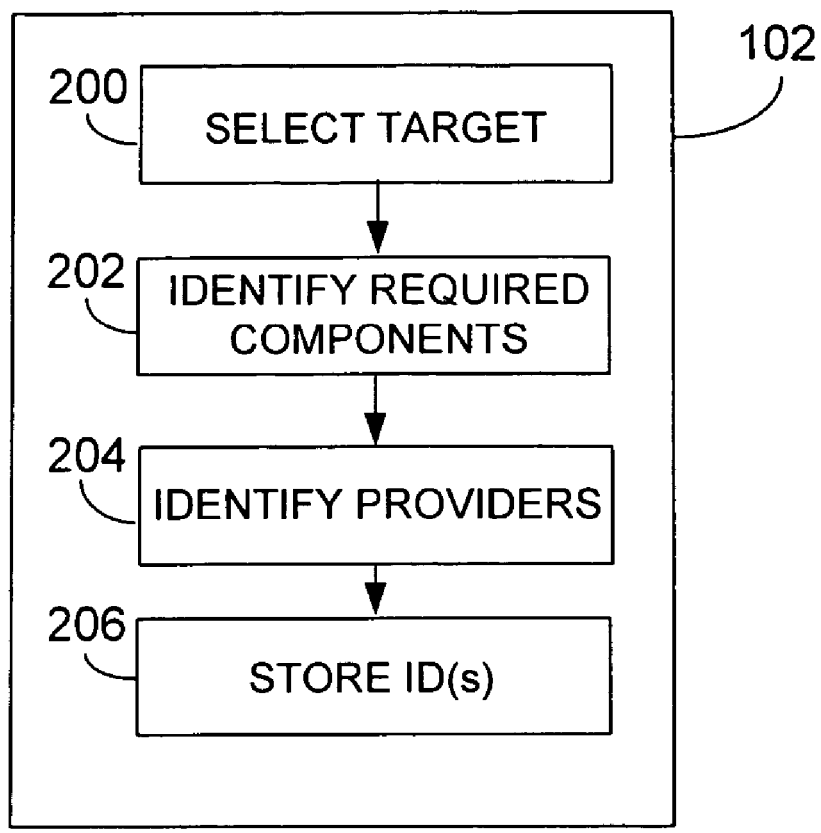
FIG. 4 is a flow diagram.

As shown in FIG. 4, incremental solution determination sub-process 102 includes selecting (200) one of the providers as a target to install a requested solution. Incremental solution determination sub-process 102 identifies (202) required components of the requested solution and identifies (204) providers having resources available to handle the required components. Incremental solution determination sub-process 102 stores (206) identifications of the identified providers along with associated required components in a hierarchical data structure in a memory of the target system, each of the associated identified components defining a set of required resources. In a particular example, the hierarchical data structure is a tree.

In a tree, records are stored in locations called leaves. This name derives from the fact that records always exist at end points; there is nothing beyond them. The starting point is called the root. The maximum number of children per system is called the order of the tree. The maximum number of access operations required to reach the desired record is called the depth. In some trees, the order is the same at every system and the depth is the same for every record. This type of structure is said to be balanced. Other trees have varying numbers of children per system, and different records might lie at different depths. In that case, the tree is said to have an unbalanced or asymmetrical structure.

Figure 5:
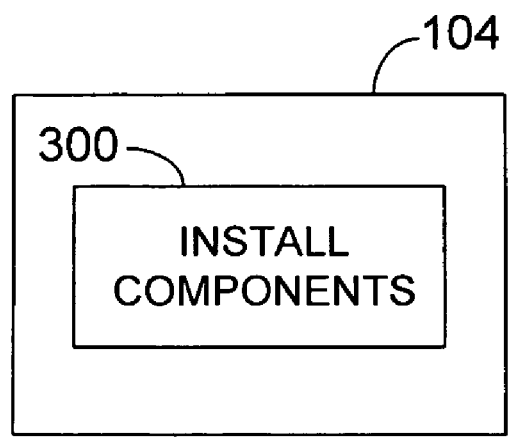
FIG. 5 is an event diagram.

As shown in FIG. 5, resource provisioning sub-process 104 includes installing (300) the required components listed in the hierarchical data structure.

Figure 6:
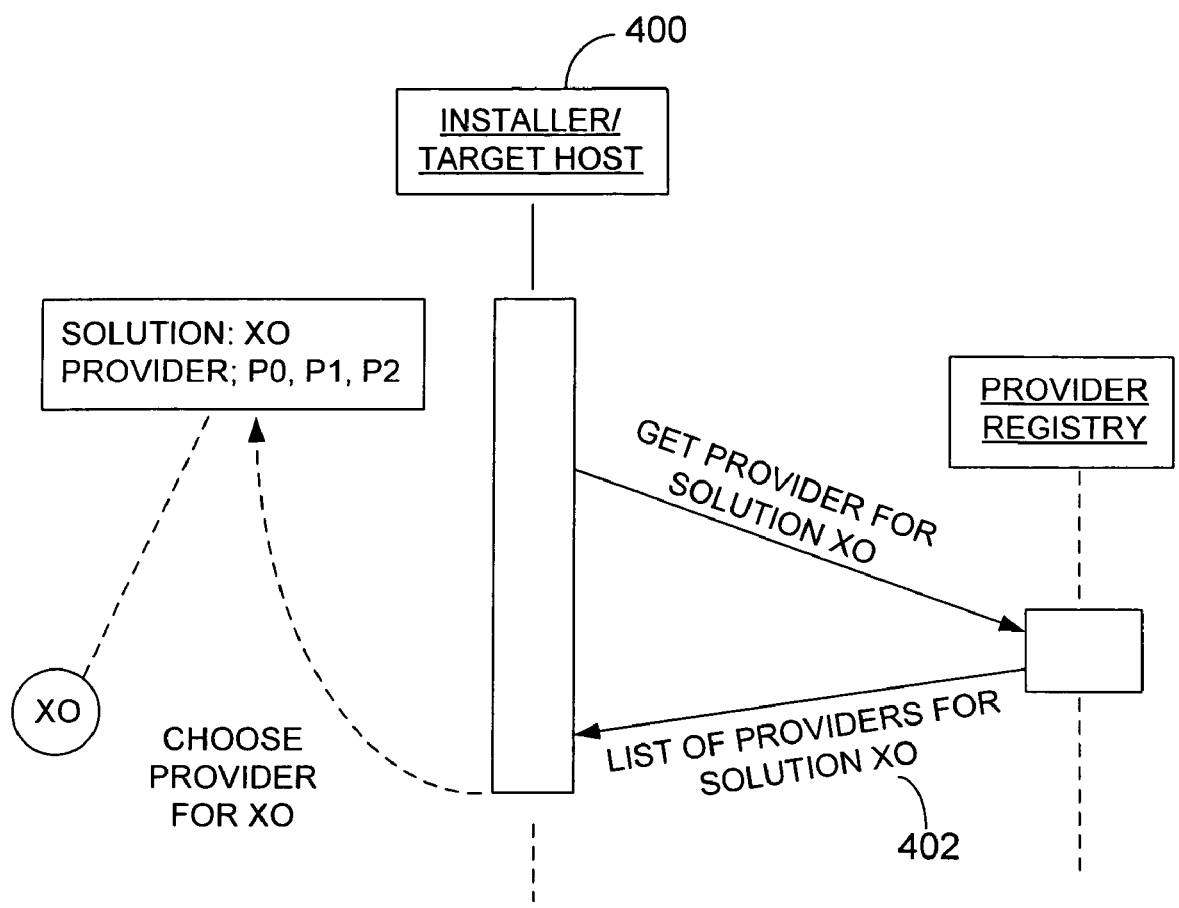
FIG. 6 is an event diagram.

Process 100 advantageously performs an incremental solution determination and resource provisioning. For example, as shown in FIG. 6, a target host 400 performs an initial lookup by querying providers of the solution, which can be listed in a provider registry 402. From the returned list of possible providers one provider is chosen.

Figure 7:
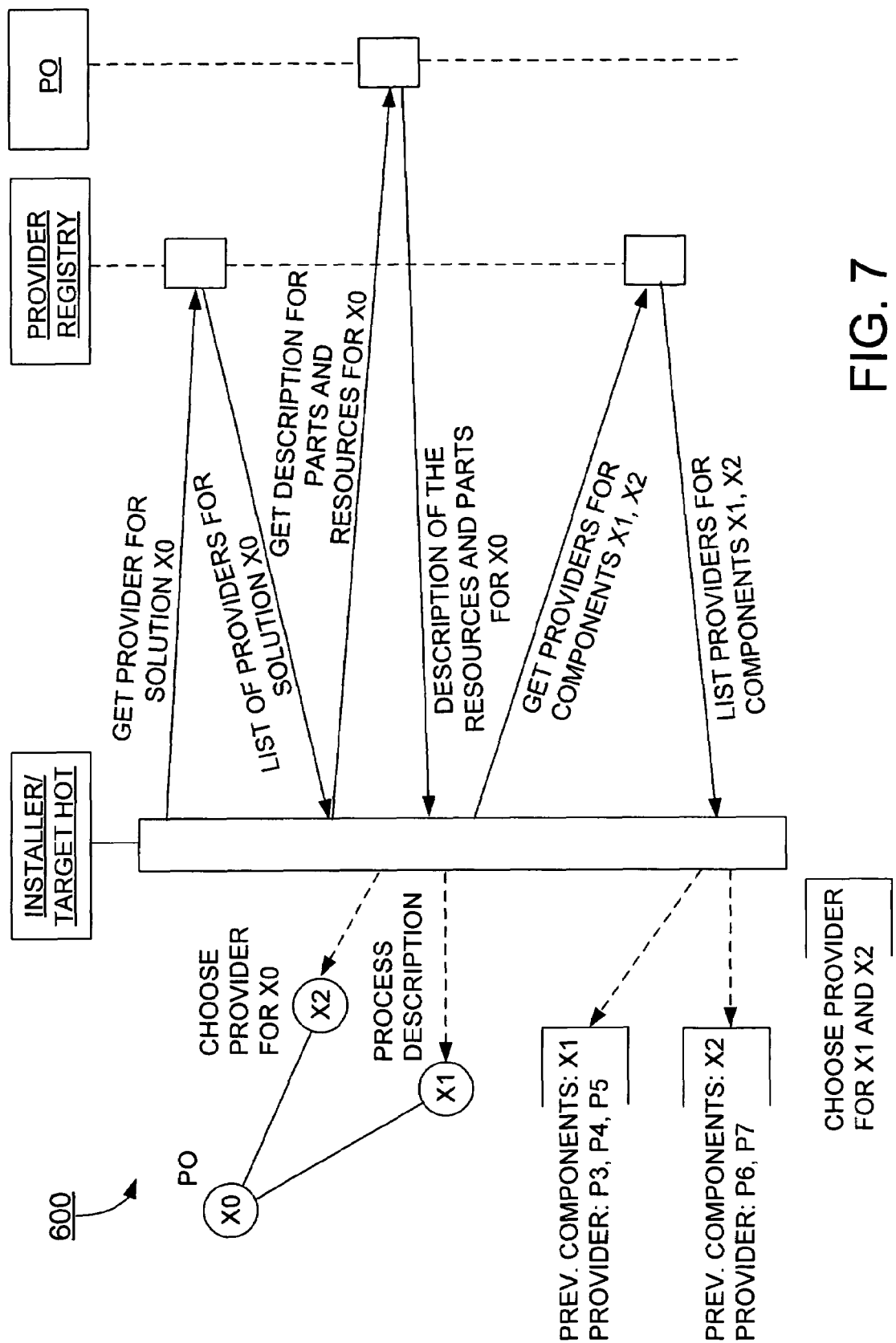
FIG. 7 is an event diagram.

The selected provider is contacted to stage a description of required resources of the solution and its further parts list. For example, as shown in FIG. 7, resource descriptions for components X1 and X2, which are required parts for solution X0, are dynamically provisioned depending on the provider. These components X1 and X2 are added to a hierarchical data structure 600 (e.g., solution tree).

Figure 8:
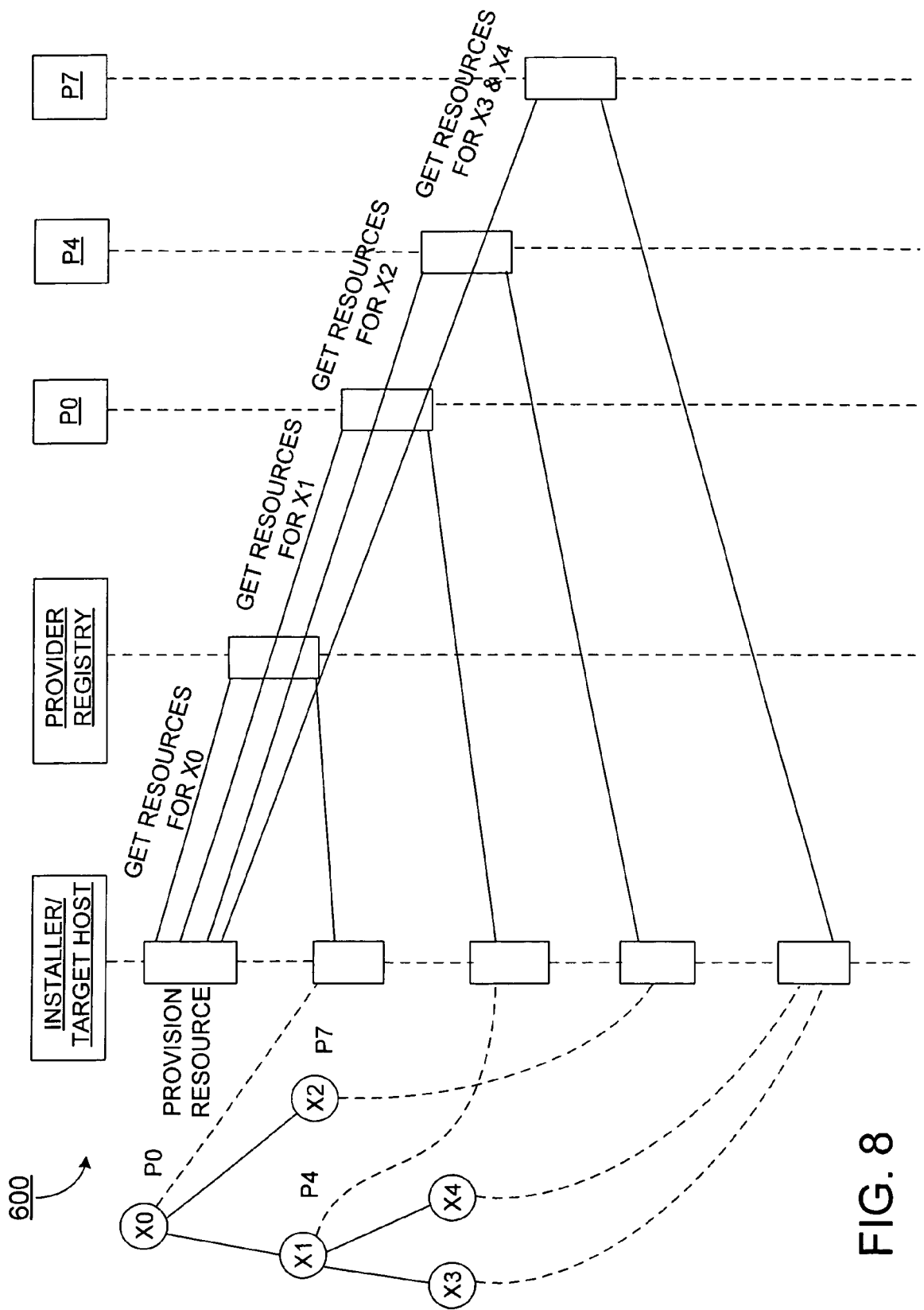
FIG. 8 is an event diagram.

As shown in FIG. 8, solution determination is recursively processed until the leafs of the solution tree 600 is reached (e.g., no further resources that have to be provisioned externally are needed for the solution).

Figure 9:
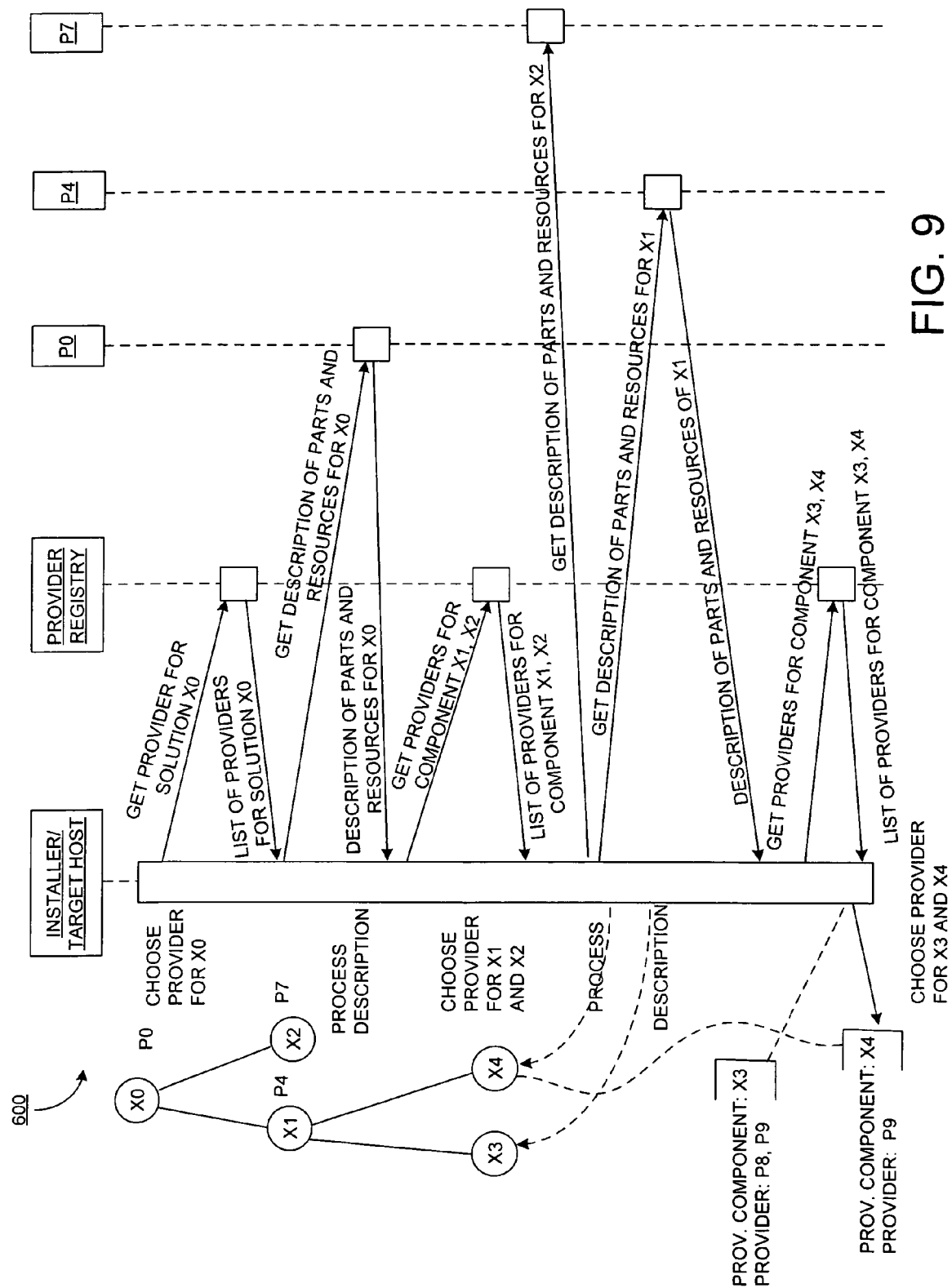
FIG. 9 is an event diagram.
Like reference symbols in the various drawings indicate like elements.

As shown in FIG. 9, in a final phase, resources that are described in the solution tree 600 are provisioned, i.e., each provider for each resource is contacted to provide the required resources.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

What is claimed is:

1. A method for solution resources determination and provisioning comprising:

in a target compute system residing in a network of interconnected compute systems, assigning a unique identifier to a requested solution;

receiving a user preference regarding preferred components for solutions;

determining a list of possible providers for the requested solution by querying a provider registry;

selecting a provider for providing identified components of the requested solution from the list of possible providers;

recursively determining additional providers for providing sub-components of the identified components;

building a first component tree and a second component tree of identified components and sub-components to achieve the requested solution, wherein the first component tree and the second component tree comprise different identified components and sub-components for the requested solution;

selecting the first component tree or the second component tree based on the user preference;

storing identifications of the selected provider and the additional providers associated with the selected component tree, along with the identified components and sub-components in a hierarchical data structure in a memory of the target compute system, each of the identified components and sub-components defining a set of required resources; and installing the identified components and sub-components listed in the hierarchical data structure.

2. The method of claim 1 wherein the hierarchical data structure is a tree comprising a root system representing the solution identifier and leaf systems representing identified components.

3. A method for solution resources determination and provisioning comprising:

in a network of interconnected compute systems, selecting, from a provider registry containing a list of possible provider compute systems for a requested solution, one of the provider compute systems as a target system to install the requested solution;

identifying required components of the requested solution;

identifying a provider that can satisfy the required components;

recursively determining additional providers for providing sub-components of the required components;

building a first component tree and a second component tree of required components and sub-components to achieve the requested solution, wherein the first component tree and the second component tree comprise different collections of required components and sub-components;

selecting the first component tree or the second component tree based on a user preference;

storing identifications of the identified providers and additional providers associated with the selected component tree, along with the required components and sub-components in a hierarchical data structure in a memory of the target system, each of the required components and sub-components defining a set of required resources; and installing the required components and sub-components listed in the hierarchical data structure.

4. The method of claim 3 wherein the hierarchical data structure is a tree comprising a root system representing the solution identifier and leaf systems representing identified required components and associated providers.

5. A computer program product for solution resources determination and provisioning, tangibly embodied in a machine-readable storage device, the computer program product being operable to cause data processing apparatus to:

in a target compute system residing in a network of interconnected compute systems, assign a unique identifier to a requested solution;

receive a user preference regarding preferred components for solutions;

determine a list of possible providers for the requested solution by querying a provider registry;

select a provider for satisfying identified components of the requested solution from the list of possible providers;

recursively determine additional providers for proving sub-components of the identified components;

build a first component tree and a second component tree of identified components and sub-components to achieve the requested solution, wherein the first component tree and the second component tree comprise different collections of identified components and sub-components;

select the first component tree or the second component tree based on the user preference;

store identifications of the selected provider and the additional providers associated with the selected component tree, along with the identified components and sub-components in a hierarchical data structure in a memory of the target compute system, each of the identified components and sub-components defining a set of required resources; and install the identified components and sub-components listed in the hierarchical data structure.

6. The computer program product of claim 5 wherein the hierarchical data structure is a tree comprising a root system representing the solution identifier and leaf systems representing identified components.

7. An apparatus for solution resources determination and provisioning comprising:

in a network of interconnected compute systems, means for selecting, from a provider registry containing a list of possible provider systems for a requested solution, one of the provider systems as a target system to install the requested solution;

means for identifying required components of the requested solution;

means for identifying a provider having resources available to handle the required components;

means for recursively determining additional providers for providing sub-components of the required components;

means for building a first component tree and a second component tree of required components and sub-components to achieve the requested solution, wherein the first component tree and the second component tree comprise different collections of required components and sub-components;

means for selecting the first component tree or the second component tree based on a user preference;

means for storing identifications of the identified providers and additional providers associated with the selected component tree, along with the required components and sub-components in a hierarchical data structure in a memory of the target system, each of the required components and sub-components defining a set of required resources; and means for installing the required components and sub-components listed in the hierarchical data structure.

8. The apparatus of claim 7 wherein the hierarchical data structure is a tree comprising a root system representing the solution identifier and leaf systems representing identified required components and associated providers.

* * * * *